Aug. 6, 1957 G. C. JACKSON 2,801,802
AUTOMOBILE HEATING SYSTEM
Filed Aug. 31, 1953
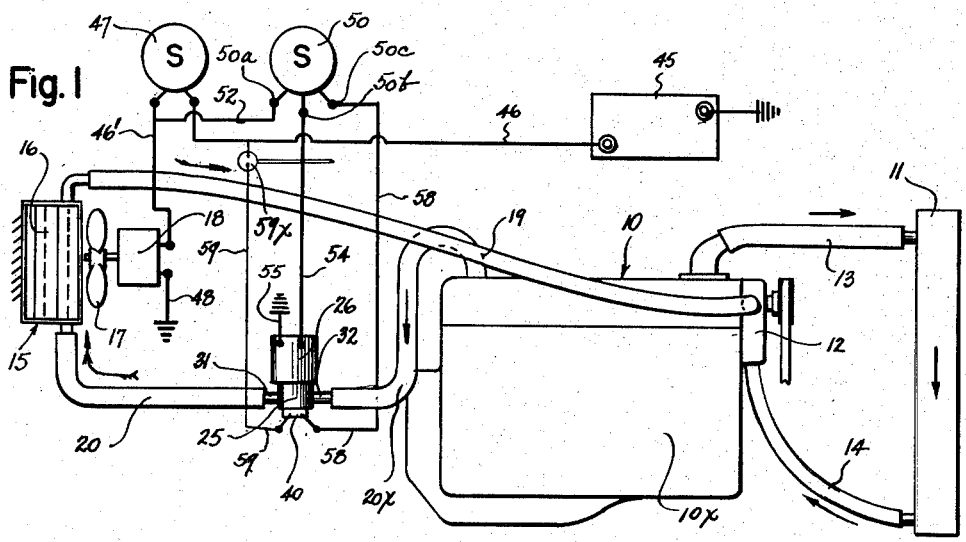
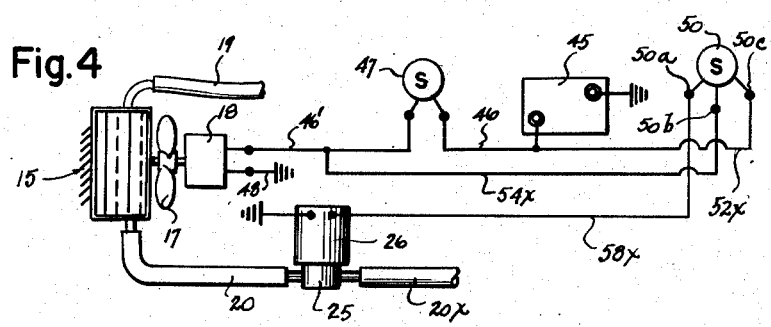
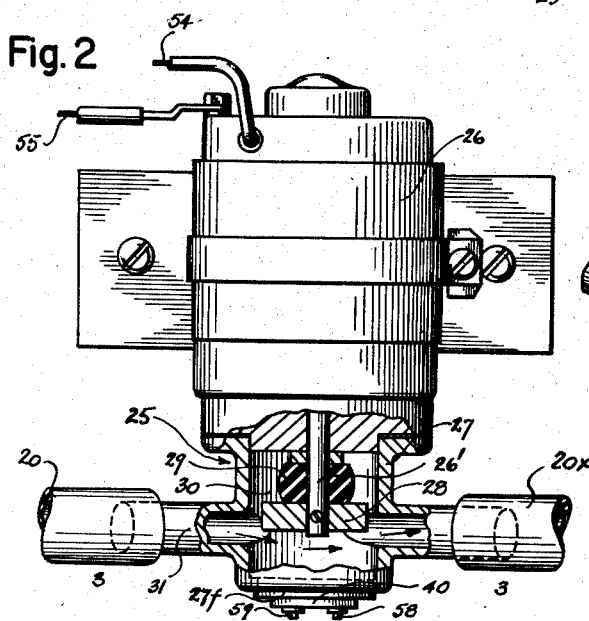
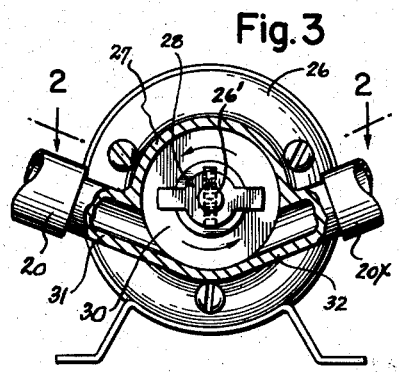
INVENTOR.
Glen C. Jackson
BY
Cook & Robinson
ATTORNEYS

United States Patent Office 2,801,802
Patented Aug. 6, 1957

2,801,802

AUTOMOBILE HEATING SYSTEM

Glen C. Jackson, Seattle, Wash.

Application August 31, 1953, Serial No. 377,496

1 Claim. (Cl. 237—8)

This invention relates to automobile heating systems and it has reference more particularly to heating systems of those kinds or types that employ the circulated liquid of the automobile engine cooling system as the heat conveying medium.

It is the principal object of this invention to provide improvements upon the specific automobile heating systems shown in United States Patents Nos. 2,230,051 and 2,170,032, in each of which an auxiliary pump is provided as a means for continuing the circulation of the hot engine cooling liquid through the circulatory system of the automobile heater after the engine has been stopped; the improvement embodied by the present invention residing primarily in the provision of an auxiliary, motor driven pump applied in the heater circulatory system supplemental to the engine driven pump, and in the provision of novel inter-connected control circuits for the motor of the auxiliary pump and the motor which drives the heater fan.

More specifically stated, the objects and advantages of the present invention reside in the interposing of a novel form of motor driven pump in one of the conduits of the water or coolant circulatory system extending between the engine and the automobile heating radiator, and providing an electrical control circuit for the system which permits use of the vehicle heating system without aid of the auxiliary pump so long as the engine is in operation and the coolant at a designated temperature, and provides for operation of the auxiliary pump to continue circulation of coolant after the engine has been stopped. Furthermore, in the provision of means to effect an automatic shut-off of the motor of the auxiliary pump when the temperature of the coolant in the system has dropped below a predetermined degree.

Further objects and advantages reside in the details of construction of parts embodied in the circulatory and control systems and in the mode of operation as will hereinafter be fully described.

In accomplishing these and other objects of the invention, I have provided the improved details of construction, the preferred forms of which are illustrated in the accompanying drawings wherein:

Fig. 1 is a diagrammatic showing of the present improved automobile heating system.

Fig. 2 is a top or plan view, partially in section, of the auxiliary pump as applied in a conduit of the water circulating system.

Fig. 3 is a cross-section on line 3—3 in Fig. 2.

Fig. 4 illustrates an alternative wiring diagram.

Referring more in detail to the drawings:

In Fig. 1, I have shown rather diagrammatically, a typical automobile engine, designated in its entirety by numeral 10. This engine has the usual cooling system comprising the radiator 11, engine driven pump 12 mounted on or comprised in the engine, and hose connections 13 and 14; the hose connection 13 leads from the engine's cylinder head to the top of the radiator 11 and the hose 14 leads from the base of radiator 11 to engine pump 12, for return of coolant to the engine. Normal operation of the engine results in the liquid coolant, which for convenience of description, will hereinafter be referred to as "water," being circulated by the engine driven pump 12 through the radiator 11 in the direction indicated by the arrows adjacent thereto.

Fig. 1 of the drawing also shows, in a diagrammatic way, an automobile heater 15 of typical design, containing radiator piping, designated at 16, through which hot water from the engine is caused to be circulated as presently explained. An air fan 17 is associated with this radiator 15 and it is adapted to be driven by an electric motor 18 to drive air through or into contact with the coils 16. The pipe coil 16 is connected at its upper end with the inlet side of pump 12, by means of a hose or conduit 19. The other end of the coil 16 is connected to the water jacket of the engine's cylinder head by means of a conduit comprised of two parts 20 and 20x which are joined together through the mediacy of an interposed pump 25; this being the auxiliary pump of the present invention. The pump 25 is driven by an electric motor 26 as presently explained.

For the successful operation of the present system it is necessary that the pump 25 shall not, when idle, interfere with free flow of the cooling water through the heater 15 and its conduit system. Therefore, I employ a pump structure as seen best in Figs. 2 and 3 wherein 27 designates a cylindrical housing in which, at one end thereof, is contained a rotary, two vane impeller 28 fixed on the drive shaft 26' of motor 26, which shaft extends into the housing 27, coaxially thereof and in a water tight seal 29. A chamber 30 of substantial volume is provided at one side of the impeller. Leading into and from the housing, at the bottom and tangentially thereof but in opposite directions are nipples 31 and 32 to which the hose sections or conduits 20 and 20x are attached. When the impeller 28 is at rest, it offers no resistance to flow of water through the pump housing 27, but when it is being driven, it operates to draw water from the engine 10 through the conduit 20x and deliver it through conduit 20 to the heater radiator 16 from which it returns to the engine through hose 19 and pump 12.

Fixed on the face plate 27f of the pump housing is a thermostatic switch 40 for a purpose presently explained. This switch, being fixed on housing 27 is readily affected by temperature of water circulated through the housing; it might, however, be located at any other suitable point in the circulatory system.

The electrical control circuits for the system employs the engine battery 45 or other source of electrical energy. One pole of the battery is grounded as indicated in Fig. 1. A circuit wire 46 leads from the other pole of the battery to a control switch 47 and from this a wire 46' leads to one terminal of the fan driving motor 18. The other terminal of the motor 18 is grounded by wire 48. Thus, the operation of the fan 17 is under control of switch 47, and normally is driven for heating the automobile while the engine 10 is in operation.

In order to control the operation of the auxiliary pump 25 and to effect the automatic shut-off of its driving motor when the water temperature in the system drops below a predetermined degree, I provide the following electrical connections:

Located at a convenient place in the vehicle is a three pole switch 50. One pole, 50a, is connected by wire 52 with wire 46' between switch 47 and motor 18. Another pole, 50b is connected by wire 54 to one side of the motor 26, which has its other side grounded by a wire 55. The third pole, 50c, of switch 50 is connected by wire 58 with one side of thermostatic switch 40 which has its other side connected by wire 59 to wire 46. A vacuum controlled switch 59x is interposed in this connection for a purpose presently explained.

Assuming then that the thermostatic switch 40 is closed by reason of the temperature of water in circulation being within a designated temperature range, and also that the vacuum switch 59x is closed, the closing of three pole switch 50 causes current to flow through wires 46 and 59, thermostatic switch 40, wire 58, switch 50 and wires 52 and 46' to the fan motor 18 thus to drive the fan. Also, by closing switch 50 a circuit is closed therethrough to wire 54 and the electric motor 26 which operates to drive the pump 25 to effect the circulation of the water through the radiator 15, independently of the engine pump. When the thermostatic switch 40 opens, by reason of drop of temperature of the water below that of a designated range, the circuit to fan motor and pump motor is interrupted and both motors stop. The present system of control makes possible the operation of the heater 15 in the normal manner under control of switch 47 so long as the engine 10 is in operation. However, after the engine has been stopped, and it is desired to continue the circulation of the water of the engine cooling system so long as heat can be derived therefrom, the switch 47 is opened and switch 50 is closed. This results in the driving of the heater fan and circulating pump 25 until the switch 40 is caused, by drop in temperature of the circulated medium to be opened.

The vacuum switch 59x is connected by a vacuum tube with the suction manifold of the engine and is thereby opened incident to operation of the engine. Thus, operation of the pump 25 is stopped by the normal operation of the engine and circulation of the hot water through the heater 15 is at that time effected by pump 12.

This system is applicable to all present day automobile heating systems without any material change therein.

For systems not including the thermostatic switch 40, I employ a wiring circuit like that of Fig. 4, wherein the switch 47 is connected with the heater motor in the same manner as in Fig. 1, but the switch 50 has pole 50c connected by wire 52x with wire 46; pole 50b connected by wire 54x with the wire 46' and has pole 50a connected by wire 58x with one pole of motor 26, which has its other pole grounded by wire 55.

Having thus described my invention, what I claim as new therein and desire to secure by Letters Patent is:

The combination with the cooling system of an internal combustion engine of an automobile including a pump that is driven by the engine for effecting the circulation of the coolant through the cooling system, and an automobile heater radiator with supply and return conduits connecting it with the cooling system of the engine in a manner whereby the said engine driven pump, in operation, also maintains a circulation of engine coolant through said heater; an air fan for the radiator and an electric motor for driving said fan, a motor driven pump interposed in one of its connecting conduits and operable to effect circulation of engine coolant through the engine and heater radiator when the engine and its pump are not in operation, said motor driven pump comprising a cylindrical housing providing a pump chamber, an impeller wheel contained in said chamber and operable by the pump motor to effect mechanical circulation of the engine coolant through the heater radiator; said pump chamber having intake and discharge ducts directed tangentially thereof in the plane of the impeller wheel, and providing a by-pass around the impeller wheel for the free flow of the engine coolant through the housing under influence of the engine driven pump when the impeller wheel is idle, a source of electrical energy for the pump driving motor, a control circuit connecting said source of electrical energy with said motor, a manual control switch in the circuit, a thermostatic switch in the circuit, acted on by the engine coolant to automatically open and close under control of temperature of the said coolant, a controlled circuit connecting the fan motor with the source of electrical energy and a switch in said circuit, and a vacuum switch in series in the circuit connected with the suction manifold of the engine to open when the engine is idle.

References Cited in the file of this patent

UNITED STATES PATENTS

| | | |
|---|---|---|
| 2,019,991 | Nilson | Nov. 5, 1935 |
| 2,159,284 | Miller | May 23, 1939 |
| 2,201,916 | Parsons | May 21, 1940 |
| 2,226,612 | McCollum | Dec. 31, 1940 |
| 2,230,051 | Conklin | Jan. 28, 1941 |
| 2,243,562 | Hans | May 27, 1941 |
| 2,357,404 | Heyman | Sept. 5, 1944 |